Figure 1:
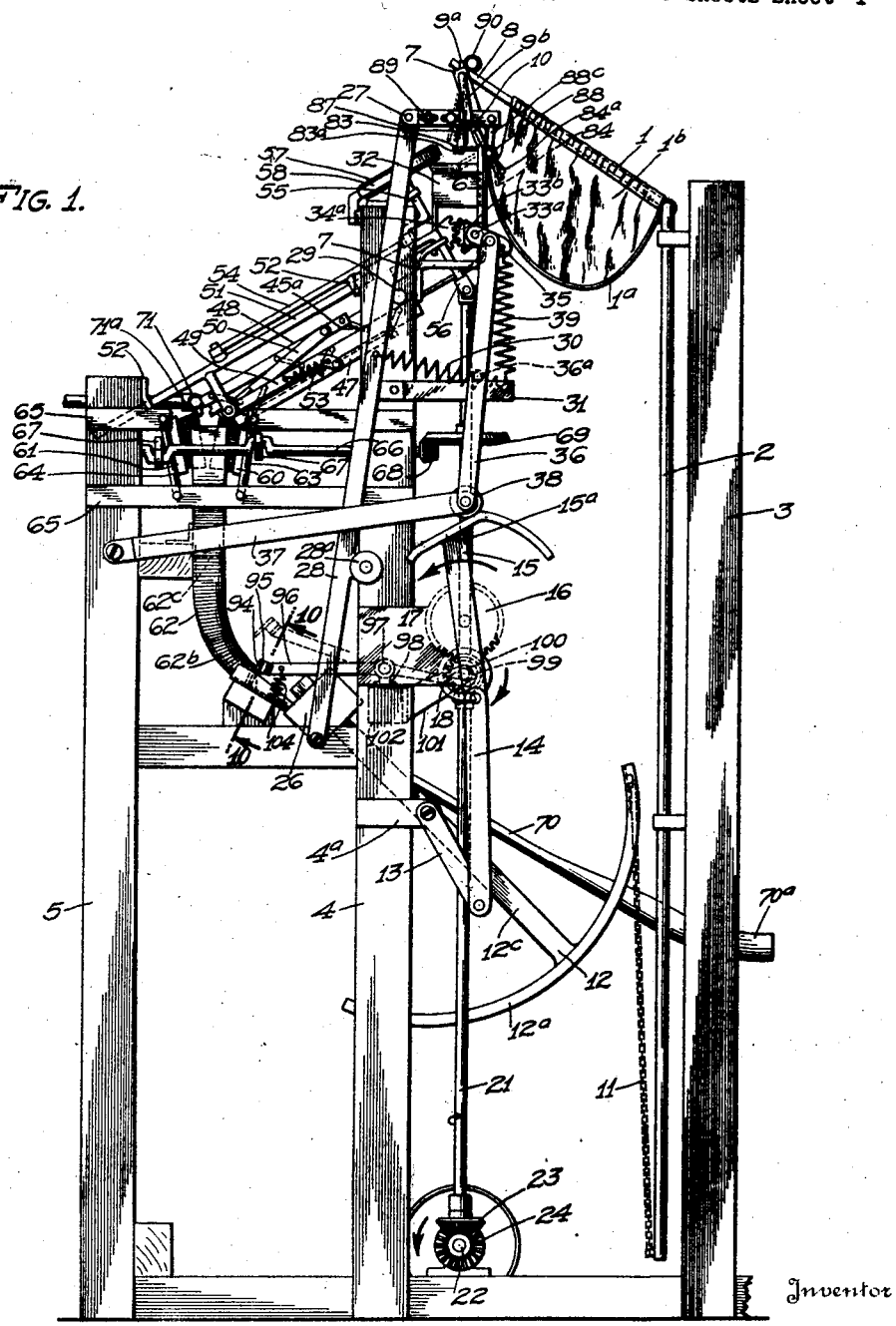

May 10, 1927. 1,627,899
F. HEATH
FISH SEGREGATING, DIRECTING, TIMING, AND TURNING APPARATUS
Filed June 25, 1925 5 Sheets-Sheet 1

Inventor
FRANK HEATH.
By A. B. Bowman
Attorney

May 10, 1927.

F. HEATH 1,627,899

FISH SEGREGATING, DIRECTING, TIMING, AND TURNING APPARATUS

Filed June 25, 1925   5 Sheets-Sheet 2

Inventor
FRANK HEATH.

By A. B. Bowman
Attorney

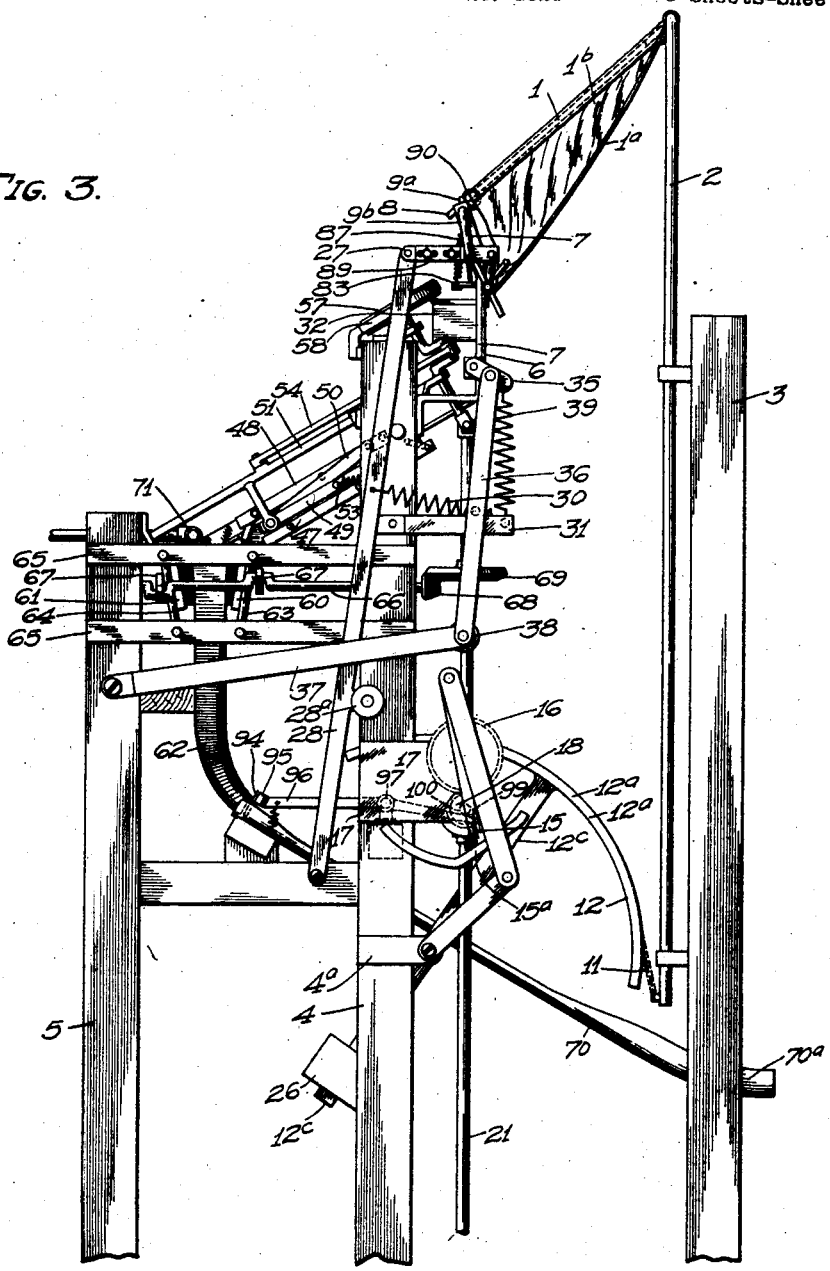

May 10, 1927.
F. HEATH
1,627,899
FISH SEGREGATING, DIRECTING, TIMING, AND TURNING APPARATUS
Filed June 25, 1925  5 Sheets-Sheet 4
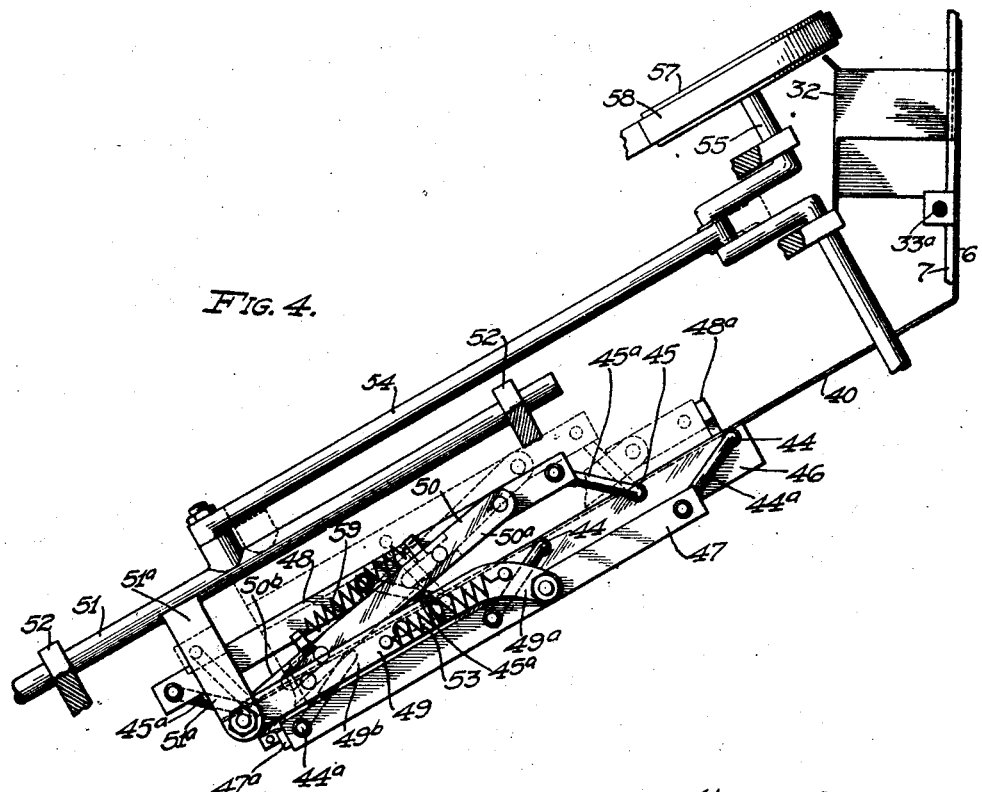
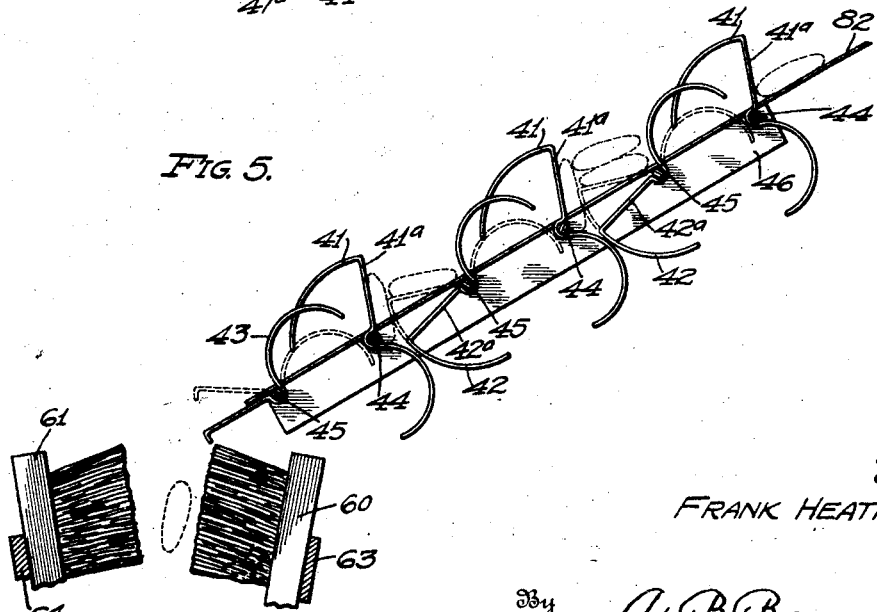
Inventor
FRANK HEATH.
By A. B. Bowman
Attorney May 10, 1927. 1,627,899
F. HEATH
FISH SEGREGATING, DIRECTING, TIMING, AND TURNING APPARATUS
Filed June 25, 1925 5 Sheets-Sheet 5

Inventor
FRANK HEATH.
By A. B. Bowman
Attorney

Patented May 10, 1927.

1,627,899

UNITED STATES PATENT OFFICE.

FRANK HEATH, OF NATIONAL CITY, CALIFORNIA.

FISH SEGREGATING, DIRECTING, TIMING, AND TURNING APPARATUS.

Application filed June 25, 1925. Serial No. 39,557.

My invention relates to a fish segregating, directing, timing and turning apparatus to be used in connection with other apparatus for preparing sardines for canning or other preserving purposes, and the objects of my invention are: first, to provide an apparatus of this class which is very sensitive and delicate and particularly adapted for handling tender fish such as sardines; second, to provide an apparatus of this class which is adapted to receive sardines or other fish of any size and arranged in any and all positions from crates or any other transporting containers; third, to provide a means in connection with an apparatus of this class for positioning the fish transversely with the general path of the fish through the apparatus; fourth, to provide an apparatus of this class whereby a few fish are segregated at intervals from the mass discharged into the apparatus, and an apparatus whereby the few segregated fish are segregated from each other and allowed to pass singly through the apparatus; fifth, to provide an apparatus of this class having a means for directing the fish with their heads in one direction and turning the same on their backs in connection with a means for segregating the fish from each other; sixth, to provide a novel means in connection with an apparatus of this class for segregating a few fish at intervals from an intermittently shiftable receptacle; seventh, to provide a means in connection with an apparatus of this class for segregating the few fish separated from the mass in the receptacle into units for the different units of the apparatus; eighth, to provide a novelly constructed and operated means for individually segregating the fish from each other; ninth, to provide a novel means for timing the fish in their path so that the same are discharged at certain timed intervals into a beheading or other machine synchronized with the apparatus; tenth, to provide a novelly constructed shiftable hopper for an apparatus of this class; eleventh, to provide as a whole a novelly constructed and arranged fish segregating, directing and turning apparatus, and twelfth, to provide such an apparatus which is simple and economical of construction proportionate to its functions, durable, efficient, easy to operate, and which will not readily deteriorate or get out of order.

Figure 2:
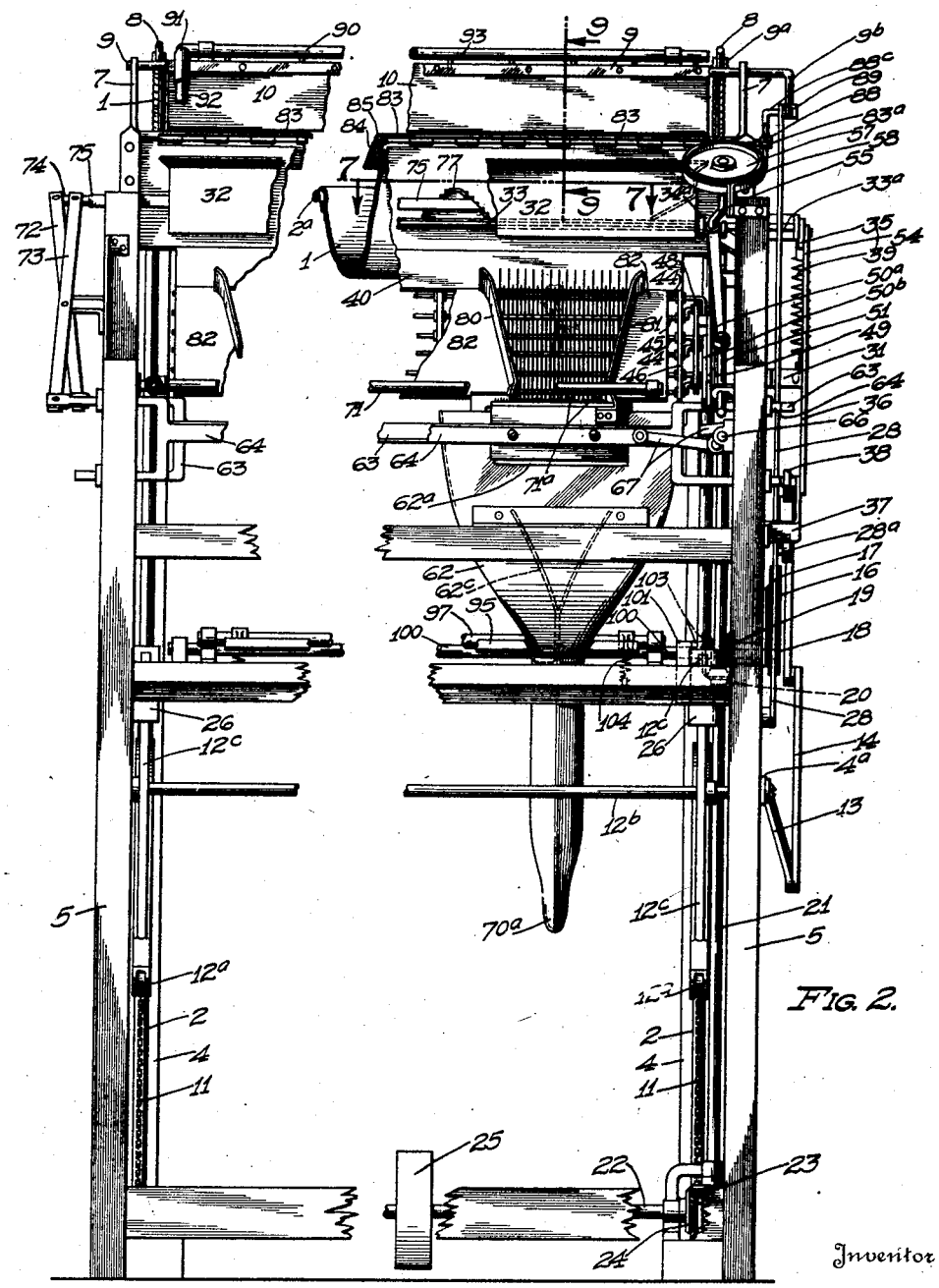
Figure 6:
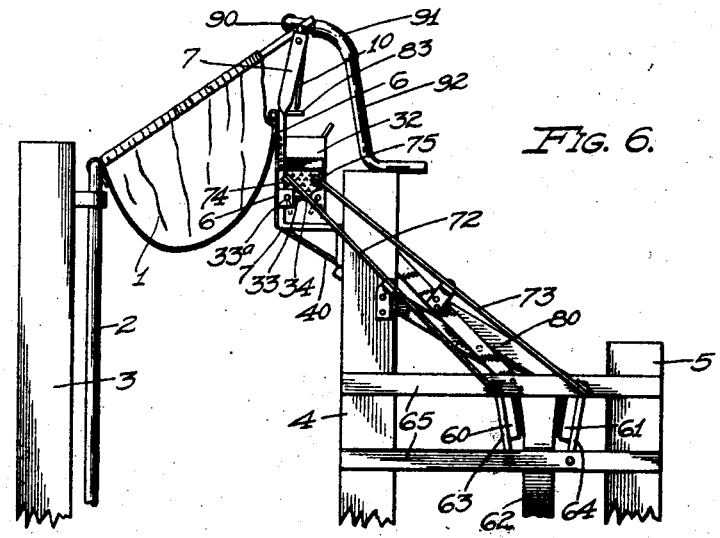
Figure 7:
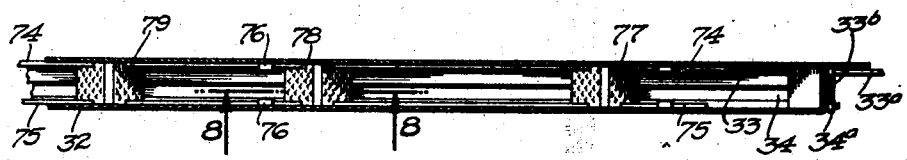
Figure 8:
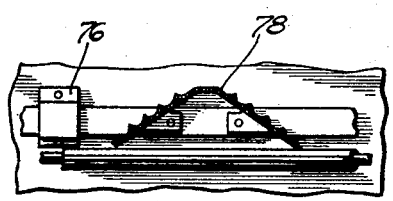
Figure 10:
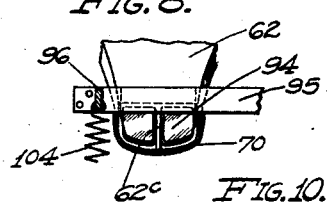
Figure 9:
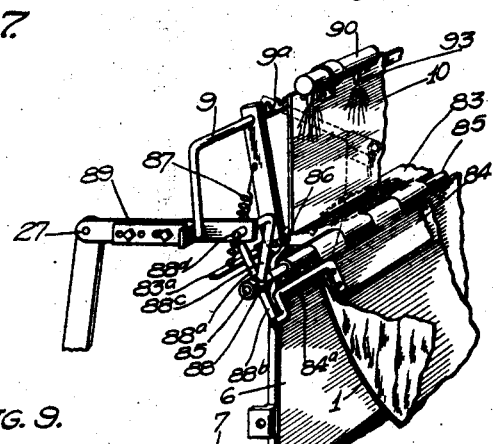

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of my fish apparatus, showing certain parts and portions thereof broken away to facilitate the illustration; Fig. 2 is a fragmentary rear view thereof, showing one complete unit and the operating mechanism thereof; Fig. 3 is a fragmentary side elevational view thereof similar to that shown in Fig. 1 but showing the various members in different shifted positions; Fig. 4 is an enlarged fragmentary side elevational view of the mechanism for operating the segregating members for individualy segregating the fish from each other, showing by dotted lines certain shifted positions of certain members of the mechanism; Fig. 5 is an enlarged side elevational view of the segregating members operated by the mechanism shown in Fig. 4; Fig. 6 is a fragmentary side elevational view of my apparatus, showing the upper portion thereof only, the view being taken from the side opposite that shown in Figs. 1 and 3; Fig. 7 is a sectional view of a fragmentary portion of my apparatus in plan, showing the means for shifting the fish into separate units, with the section taken through 7—7 of Fig. 2; Fig. 8 is an enlarged fragmentary sectional view of the means shown in Fig. 7, with the section taken on the line 8—8 thereof; Fig. 9 is an enlarged fragmentary perspective view of the means for segregating the fish from the mass in the shiftable hopper; and Fig. 10 is an enlarged fragmentary sectional view, taken through 10—10 of Fig. 1, showing the means for timing the fish before leaving the apparatus so that the same may be discharged into other machines or apparatus at timed intervals.

Like characters of reference refer to similar parts and portions throughout the several views of the drawings.

The shiftable hopper 1, hopper guide and supporting rods 2, frame members 3, 4 and 5, hopper supporting plate 6, brackets 7, hopper end member supporting rods 8, rod 9, limiting plate 10, chains 11, quadrant member 12, crank arm 13, link 14, cam supporting arm 15, gear 16, gear journal support 17, pinion 18, bevel gears 19 and 20, vertical drive-shaft 21, main drive-shaft 22, bevel gears 23 and 24, drive pulley 25, weight 26, link 27, plate actuating arm 28, stop 29, spring 30, bracket 31, bunching bin 32, trap doors 33 and 34, trap door actuating arm 35, link 36, roller supporting arm 37, roller 38, spring 39, inclined plate 40, segregating fingers 41, 42 and 43, segregating finger supporting rods 44 and 45, rod supports 46, rod actuating bars 47 and 48, extensible bar actuating links 49 and 50, operating rod 51, support 52, spring 53, connecting rod 54, crank member 55, universal joint 56, brake-wheel 57, brake-band 58, spring 59, brushes 60 and 61, fish directing receptacle 62, brush supports 63 and 64, supporting bars 65, crank-shaft 66, connecting links 67, bevel pinion 68, bevel gear 69, fish turning chute 70, water conductor 71, levers 72 and 73, bunching member reciprocating rods 74 and 75, rod supports 76, bunching members 77, 78 and 79, fish guide members 80 and 81, cover plates 82, fish supporting plate 83, excess dumping plate 84, rod 85, stop 86, spring 87, lever member 88, stop member 89, conductor 90, flexible connection 91, conductor 92, spraying nozzles 93, fish stop members 94, supporting rod 95, supporting arms 96, shaft 97, journal 98, cams 99, cam-shaft 100, cam-shaft supporting bracket 101, frame member 102, bevel gear 103, and the tension springs 104, constitute the principal parts and portions of my fish apparatus.

The hopper 1, which is a flexible, intermittently shiftable or dumping receptacle, is positioned at the upper portion of the front of the apparatus. Said hopper is preferably made of fabric material and is provided with a long bottom member 1$^a$ extending across the apparatus with the front edge of the bottom member looped around the cross member 2$^a$ connecting the upper ends of the vertical hopper guide and supporting rods 2, which are reciprocally mounted on the front upright frame members 3. The rear edge of the bottom member of the hopper is secured near the upper edge of a vertical plate 6 extending across the apparatus and supported at its ends by means of brackets 7 in front of the intermediate upright frame members 4. The end members 1$^b$ of the hopper 1 are secured to the ends of the bottom member 1$^a$ thereof and are secured at their upper edges to rods 8 which are pivotally mounted at their front ends on the cross member 2$^a$ and at their rear ends pivotally and reciprocally in guide portions 9$^a$ on the rod 9 rotatably mounted near its ends at the upper ends of the brackets 7. The hopper 1, by reason of its long flexible construction and the substantially upward rolling of its flexible bottom member during the upward shifting of the hopper, is adapted to position the fish lengthwise therein and transversely with the general path of the fish through the apparatus.

To the lower ends of the hopper shifting or dumping rods 2 are secured the one ends of cables or chains 11 which are secured at their opposite ends to the one ends of the arcuate channel-shaped portions 12$^a$ of the quadrant members 12. These members 12, there being one on each side of the apparatus, are secured relatively to each other by means of a shaft 12$^b$ which is rotatably mounted in supports 4$^a$ secured to the upright frame members 4. To the one end of the shaft 12$^b$, at the left side of the machine, is secured an arm 13, which is pivotally connected at its free end, by means of a link 14, to the one end of an arm 15 extending diametrically across and secured to a gear 16. Said gear meshes with and is driven by a pinion 18, which, together with the gear 16, is revolubly mounted in a journal support 17 secured to the one frame member 4. On the shaft supporting the pinion 18 is mounted a bevel gear 19, which meshes with a bevel pinion 20 secured intermediate the ends of and to the vertical drive-shaft 21. At the lower end of the shaft 21 is secured another bevel gear 23 which meshes with a bevel gear 24 secured to the one end of the main drive-shaft 22, which may be driven by a pulley 25, as shown in Fig. 2, or by any other suitable means.

On the ends of the arms 12$^c$ of the quadrant members 12 supporting the arcuate channel-shaped portions 12$^a$ thereof, and opposite side channel-shaped portions, are provided shiftable weights 26 for balancing the shiftable hopper 1.

The means for segregating a few fish from the mass in the hopper 1 is shown best in Fig. 9 and consists essentially of a quantity limiting plate 10, secured at its upper edge to and extending downwardly from the rod 9 a fish supporting plate 83 and an excess dumping plate 84. Said plates 83 and 84 are hinged relatively to each other at their adjacent edges on a rod 85 mounted at the upper edge of the plate 6. The plate 83 extends backwardly from its hinged portion to underneath the lower edge of the plate 10 and is adapted to support lengthwise thereon a few fish discharged from the hopper 1. The plate 84 normally extends downwardly into the hopper 1 and is adapted to be raised about its pivotal support with the upward shifting of the hopper to facilitate the discharge of the fish from the hopper by reason of the angular position of the latter plate when shifted upwardly. The plate 83 is normally held in a substantially horizontal position against a stop 86, mounted on the bracket 7, by means of a tension spring 87 secured at its one end on the bracket 7 and at its opposite end to an extended portion 83ª at the one end of the plate 83. The plate 84 is normally held in a downwardly extending position by gravity. On the left-hand end of the rod 85 is rotatably mounted a lever member 88 provided with oppositely extending arms 88ª and 88ᵇ adapted to engage respectively the extended portion 83ª of the plate 83 and an extended offset arm 84ª secured to the left-hand end of the plate 84 and extending through the corresponding end of the hopper 1. Said arms 88ª and 88ᵇ are adapted to shift the plate 83 downwardly and the plate 84 upwardly, respectively. Said lever member 88 is provided with another arm 88ᶜ extending angularly relatively to the arms 88ª and 88ᵇ and provided with a right angle bend 88ᵈ extending through the one end of the link 27 adapted to rotate the member 88. The left-hand end of the rod 9 is also provided with a right angle bend or crank portion 9ᵇ which extends downwardly from the main portion of the rod 9 and is adapted to be engaged at its lower end by the portion 88ᵈ of the arm 88ᶜ extending through the link 27 and by a stop member 89 adjustably secured to the one side of the link 27. It will be noted that the stop member 89 is adjustably secured to the link 27 so as to vary the inclination of the plate 10 when stationary, and, therefore, vary the space between the lower portion of the same and the forward pivotal edge of the plate 83 to limit the number of fish adapted to be discharged thereon by the hopper, the number of fish discharged on the plate 83 in excess of the space provided therefor dropping back into the hopper over the plate 84.

The plate 10 is tilted backwardly about its pivotal support when the crank portion 9ᵇ of the rod 9 is engaged by the portion 88ᵈ extending through the link 27, during the backward movement of said link.

The link 27 is pivotally connected at its opposite end to the upper end of an arm 28 pivotally mounted at its lower end on a cross member extending between the upright frame members 4 and 5 on the left-hand side of the apparatus. Near the upper end of said frame member 4 is provided a stop 29 to engage and limit the forward movement of the arm 28, there being provided a tension spring 30 secured at its one end intermediate the ends of said arm 28 and at its opposite end to a bracket 31 secured to the frame member 4, said spring being adapted to force said arm against said stop. Intermediate the ends of the arm 28 is mounted a roller 28ª which is adapted to be engaged by an angular and arcuate cam portion 15ª at the one end of the arm 15 secured to the gear 16, for forcing the arm 28 backwardly about its pivotal mounting and dumping the fish positioned on the supporting plate 83, however only after the hopper 1 has been shifted to its lower position.

At the back side of the plate 6 is provided a bin 32 which is adapted to receive the fish discharged from the fish supporting plate 83, and which is provided with a bottom consisting of a pair of oppositely disposed, mutually operating trap doors 33 and 34 pivotally mounted, respectively, at the front and back sides of said bin. The rod 33ª, supporting the trap door 33 within the bin, is provided near one end with a gear member 33ᵇ, which meshes with a similar gear member 34ª secured to the one end of the rod supporting the trap door 34, as shown best in Figs. 1 and 7 of the drawings. At the left-hand end of the rod 33ª is secured an arm 35, which is pivotally connected, by means of a link 36, with an arm 37 which is pivotally mounted at its one end on the one rear upright frame member 5. At the pivotal connection of the link 36 and the arm 37 is revolubly mounted a roller 38 which is adapted to be engaged by the angular and arcuate cam portion 15ª of the arm 15 during a portion of its revolution, whereby the link 36 is raised, the arm 35 rotated and the trap doors tilted about their pivotal mountings, permitting the fish in the bin to be discharged therefrom. The free end of the arm 35 is connected, by means of a tension spring 39, with the extended end of the bracket 31, whereby the trap doors are normally held in a closed position. A stop 36ª is provided intermediate the ends of the link 36, which stop is adapted to engage the bracket 31 to limit the downward movement of said link and, therefore, the closed positions of the trap doors of the bin.

Below the bin 32 is positioned an inclined fish directing plate 40, which is secured at its one edge to the plate 6 and extends downwardly and backwardly therefrom, and is adapted to feed or direct the fish discharged from the bin 32 into the means for individually segregating the same. Said individual segregating means consists essentially of a plurality of rows of segregating members or fingers 41, 42 and 43 extending transversely across the machine and so arranged relatively to each other that the fish are fed by gravity from one row of fingers to the other and individually segregated from each other. One complete unit of this segregating means is shown best in Fig. 2 of the drawings. The fingers 41, 42 and 43, shaped substantially as shown in Fig. 5 of the drawings, are secured intermediate their ends to rods 44 and 45, spaced from each other and rotatably mounted in supports 46. The fingers are so spaced on their respective supporting rods that they substantially interlock with the fingers secured to the adjacent rod.

The one rod 44 supporting the fingers 41 nearest the bin 32, as well as the alternate finger supporting rods indicated by 44 in Fig. 5 of the drawings, are provided at their one ends with crank portions $44^a$ which are pivotally connected with each other at their free ends by means of a bar 47 which is pivotally connected, by means of an extensible link 49, with a downwardly extending lug $51^a$ of the operating rod 51 reciprocally mounted in brackets 52 supported near the upper ends of the frame members 4 and 5. The extensible link 49 consists of link members $49^a$ and $49^b$ reciprocally connected with each other, the former being provided with longitudinal slots and the latter with pins extending through the slots of the former. Said link members $49^a$ and $49^b$ are adapted to be contracted relatively to each other by means of a tension spring 53. When the operating rod 51 is forced backwardly, and before its extreme backward position is reached, the bar 47, connecting the crank portions of the rods 44 with each other, engages a stop member $47^a$ which holds the one link member $49^a$ stationary while the other link member $49^b$ is permitted to move with the operating rod 51, thereby permitting the members of the extensible link 49 to be extended relatively to each other, which extended position is shown by solid lines in Fig. 4 of the drawings. The operating rod 51 is pivotally connected by means of a connecting rod 54 with the crank portion of the crank member 55, which is connected to and operated by the vertical drive-shaft 21 by means of the universal joint 56, shown best in Fig. 1. At the extended end of the crank member 55 is secured a brake-wheel 57 around which is frictionally positioned a brake-band 58 secured to the upper end of the upright frame member 4, as shown best in Fig. 1. This brake means takes up any play in the mechanism between the crank member 55 and the several rows of fingers in the individual segregating mechanism caused by the several resilient and shiftable connections of the links and the like. The finger supporting rods 45, between which the rods 44 are positioned, are also provided at their one ends, corresponding with the ends of the rods 44, with crank portions $45^a$ which are also pivotally connected with each other at their free ends by means of a bar 48 which is pivotally connected with the downwardly extending lug $51^a$ of the operating rod 51, by means of an extensible link 50. Said link 50 consists of link members $50^a$ and $50^b$ shiftably connected with each other, the latter being provided with longitudinal slots and the former with pins extending through the slots of the latter, as shown best in Fig. 4. The link members $50^a$ and $50^b$ are connected with each other by a tension spring 59 in such a manner that the link 50 is adapted to be automatically extended instead of contracted, as described in connection with the link 49. During the forward stroke of the rod 51, the bar 48 is adapted to engage a stop $48^a$ which limits the forward movement of said bar while permitting the rod 51 to move to the end of its forward stroke, thus contracting the extensible link 50.

Should two or more fish be discharged from the bin 32 onto the plate 40 and into the segregating means just described, the same would be stopped by the straight portions $41^a$ of the first row of fingers 41 when the mechanism is in the position shown in Figs. 4 and 5. If the crank member 55 is now rotated so that the operating rod 51 is shifted toward the front of the machine, the fingers 41 in the first row are turned counterclockwise so that the same assume positions similar to those of the fingers 42, shown by solid lines, and the fingers 42 and 43 assume positions shown by solid lines of the fingers 41. When said fingers 41 are rotated as last stated, the two or more fish lodged against the straight portions of the fingers 41 in the first row are discharged against the straight portions $42^a$ of the fingers 42 in the second row, the relation of the fingers in the first row to those of the second row being the same as the relation shown by solid lines of the fingers in the second to those in the third row. The relation between each two adjacent rows of fingers being the same, the two or more fish discharged or lodged against the straight portions of the first row of fingers 42 may be assumed to be the same as those lodged against the straight portions of the second row of fingers 41, as indicated by the dotted cross-sectional outline of the fish in Fig. 5. During the forward stroke of the operating rod 51, the bar 48, connecting the crank portions of the finger supporting rods 45, is shifted forwardly to an intermediate position, as shown by dotted lines in Fig. 4 of the drawings, before the bar 47, connecting the crank portion of the rods 44, starts to rotate said last mentioned rods. This temporary stationary condition of the bar 47 is due to the prior extended condition of the link 49 caused by the engagement of the bar 47 against the stop $47^a$ during the backward shifting of the rod 51. During the initial forward movement of the rod 51 the link 49 is contracted by the tension spring 53 until the rod 51 assumes the position shown by dotted lines, at which time both bars 47 and 48 are shifted forwardly permitting the fingers 41 to rotate in one direction and the fingers 42 and 43 in the opposite direction. From the above description it will be seen that during the initial forward movement of the rod 51 the fingers 41 will remain stationary, while the fingers 42 and 43 will be shifted clockwise about their pivotal mountings, the initial movement of the fingers 42 being adapted to remove all fish in excess of one from their position against the straight portions of the fingers 41 and convey the same to their former position, the one fish remaining in the position just described being lodged between the straight portions of the fingers 41 and the curved portions of the fingers 42, as shown best in Fig. 5. After the operating rod 51 has been shifted to the position shown by dotted lines, all fingers are shifted about their pivotal mountings until just before the operating rod 51 reaches its forward position, when the bar 48 will engage the stop 48ª holding the rods 45, and, therefore, the fingers secured thereto, stationary, while the bar 47 continues to the end of its forward stroke with the rod 51, therefore, continuing the pivotal movements of the fingers 41. Thus, it will be seen that should more than one fish be retained in the spaces between various rows of fingers, as described, instead of one as intended, the operation continues through several stages, there being five in number in the apparatus shown, thus assuring individual segregation of the fish before the same leave the last described segregating means.

The segregating fingers 43 in the lower transverse row are constructed similarly to the other fingers except that the curved portions at the ends of the straight portions are omitted. The positions of the fingers 43 correspond with the positions of the fingers 42. It will be here noted that the curved portions of all of the fingers are so inter-positioned with each other that the fish carried down the inclination of the individual segregating means cannot be pierced or otherwise mutilated by the ends of the fingers.

The fish discharged individually from the straight portions of the lower or rear row of segregating fingers are adapted to fall between the bristles of a pair of oppositely positioned, inclined and oppositely reciprocating brushes 60 and 61. The fish falling between these brushes are carried with and in the direction of the brush engaging the free or exposed edges of the scales of the fish, the fish being carried head foremost alternately by the oppositely disposed brushes to the ends thereof, from which they drop head foremost into a directing receptacle 62. The brushes 60 of the different units of the apparatus are secured at their back sides to a reciprocable support 63, while the other oppositely disposed brushes 61 of the several units are secured at their back sides to the reciprocable brush support 64. The brush supports 63 and 64 are provided at their ends with bifurcated portions which are reciprocally mounted in cross members 65 extending between the upright frame members 4 and 5 at each side of the apparatus. The supports 63 and 64 are alternately reciprocated by the oppositely offset crank member 66 which is revolubly supported by the frame of the apparatus and pivotally connected, by means of connecting links 67, with the brush supports 63 and 64, as shown best in Figs. 1 and 2. At the one end of the crank member or shaft 66 is provided a bevel pinion 68 which meshes with a large bevel gear 69 mounted on the vertical drive-shaft 21.

The receptacle 62, into which the fish are discharged from the brushes, is substantially heart-shaped and is provided at its front and back sides with rectangular, cutaway portions 62ª at its upper end through which the bristles or blades of the brushes extend, said cutaway portions 62ª being of such length as to permit free reciprocal movement of the brushes. As the fish are discharged into the receptacle 62, the same fall with heads foremost against the inclined surfaces at the lateral sides of the receptacle 62 and are directed with their heads foremost towards the bottom of the receptacle and out to one side by reason of the lower forwardly curved portion 62ᵇ, as shown best in Fig. 1. The fish leaving the receptacle 62 are adapted to be discharged into an inclined chute 70 positioned with its one end at and communicating with the lower forwardly directed end of the receptacle 62. In this chute 70 the fish are turned on their backs with their heads foremost, and are adapted to be discharged in this position at the opposite end of the chute, with which end is adapted to be connected a beheading and entrail removing machine or other apparatus. It will be here noted that the bottom of the chute nearest the discharge end of the receptacle 62 is slightly curved and so formed at the bottom that the depth is greatest at the axial line of the chute. This portion of the chute, as described, merges into a relatively narrow U-shaped portion 70ª at its forward or lower end, which portion 70ª is also curved upwardly so that the speed of the fish discharged into the chute is slightly retarded toward the end of the chute. The fish, particularly sardines, by reason of the greatest bulk or weight at their back portions, are automatically turned by gravity onto their backs in passing through the chute.

The lower portion of the fish directing receptacle 62 is divided by a vertical partition wall 62ᶜ, as shown best in Figs. 1, 2 and 10 of the drawings, which partition wall extends preferably slightly beyond the lower open end of the receptacle. Said partition wall is adapted to prevent the crowding of the fish, as they descend, to the opposite side of the receptacle and to prevent the swaying movement of the fish from one side of the chute to the other as the same are discharged from the receptacle 62 into the same.

At the lower, reduced, forwardly directed discharge end of each of the fish directing receptacles 62 is removably positioned a stop plate 94 which may be slotted at its lower end to receive the portion of the partition wall 62ᶜ extending beyond the lower end of the receptacle. Said stop plates 94 are all secured at their upper portions on a rod 95 which is supported near its ends at the one ends of a pair or more arms 96 which are secured intermediate their ends on a shaft 97. Said shaft 97 is rotatably mounted in journals 98 which are supported on a cross member 102 of the frame of the apparatus. On the frame member 102 are also supported journal brackets 101 in which is revolubly mounted the cam-shaft 100 which may be driven by the shaft 21 by means of a bevel gear 103 at the one end of the shaft 100, said gear meshing with the bevel pinion 20 on the shaft 21. On the shaft 100 is provided a plurality of cam members 99 which are adapted to engage the opposite free ends of the arms 96 for intermittently rotating the same in a clockwise direction about their pivotal axes, therefore, intermittently raising the stop members or plates 94 from in front of the open ends of the fish directing receptacles 62 to the dotted line position shown in Fig. 1. The stop members 94 are adapted to be held in the downward positions, shown by solid lines, by tension springs 104 preferably connected at their one ends to the arms 96 and at their opposite ends to the cross frame member upon which the lower ends of the receptacles 62 are supported.

It will be here noted that the stop members 94 perform a double function, namely, that of stopping the fish at the discharge ends of the fish directing receptacles 62, thereby starting the fish from a stop at the head ends of the chutes 70 and thus facilitating the turning of the fish onto their backs in their passage down the chutes, and also that of releasing the fish at intervals timed with machines, mechanisms or other fish apparatus adapted to be positioned at the discharge ends of the chutes 70.

To facilitate the directing and turning of the fish, as described, in the receptacle 62 and the chute 70, there is provided a water conductor 71, which is connected with a source of water supply and extends across the apparatus above the angularly positioned, oppositely disposed brushes. Said conductor is provided with a plurality of spraying nozzles 71ᵃ at its under side whereby water is sprayed over the top of the brushes and into and against the inclined surfaces of the receptacle 62 and allowed to flow down the chute 70, thus lubricating the surfaces engaged by the fish in their passage through the apparatus.

Above the fish supporting plate 83 is positioned another water conductor 90 which may be mounted on the forward side of the plate 10, as shown best in Fig. 9, and connected by means of a flexible connection 91 to a conductor 92 connected with a source of water supply, as shown in Fig. 6. On the under side of the conductor 90 is also provided a plurality of spraying nozzles 93 for spraying the upper side of the plate 83 and lubricating the surfaces adapted to be engaged by the fish in their passage through the apparatus.

The ends of the brush supports 63 and 64, opposite the means for reciprocating the same, are pivotally connected, by means of the levers 72 and 73 pivotally mounted intermediate their ends on the supporting frame, with the one ends of the rods 74 and 75, respectively. Said rods are reciprocally mounted within the bin 32 and are respectively supported at the front and rear inner sides thereof by means of supports 76, as shown best in Figs. 7 and 8. Within and near the bottom of the bin is reciprocally mounted a plurality of fish bunching members, as indicated by 77, 78 and 79 in Fig. 7, the members 77 and 79 being secured to and reciprocated by the reciprocating rod 75, and the member 78 and other similar members being secured to and reciprocated by the rod 74. Thus, it will be seen that the fish discharged from the plate 83 into the bin 32 are bunched into units for the several segregating, directing and turning units of the apparatus. The fish bunching members, as shown best by the enlarged fragmentary sectional view in Fig. 8, are provided with inclined surfaces which are provided with a plurality of upwardly extending, pointed portions or other suitable obstruction means whereby the fish falling upon, against or near said members are forced towards the middle of each operating unit, each of the adjacent fish bunching members being alternately directed against and away from each other so that the same bunching members are used in bunching the fish in two adjacent units.

As the fish are discharged from the bin 32 by the opening of the trap doors 33 and 34 onto the inclined plate 40, the same enter the individual segregating means, previously described. To facilitate the directing of the fish into this segregating means there is provided on each side of the several rows of segregating fingers an angular guide member, as indicated by 80 and 81 in Fig. 2, the former of which is connected to and reciprocated by the reciprocating brush support 63 and the latter of which is connected to and reciprocated by the brush support 64. Thus, it will be seen that there is a constant tendency of the fish to be directed towards the center of the several units. On each side of the individual segregating means is provided a plate 82 upon which the guide members 80 and 81 are mounted and whereby the fish are prevented from dropping through the apparatus.

It will be readily seen from the above that from the fish dumped promiscuously into the intermittently shiftable hopper 1, a few are discharged, by means of the plate 84, sidewise onto the supporting plate 83 when the hopper is raised, as shown in Fig. 3; that the fish discharged in an angular position onto the plate 83 and hanging over the pivotal edge of said plate will be dumped back into the hopper 1 over the plate 84; that if more fish are discharged onto the plate 83 than is intended, the surplus is discharged back into the hopper when the same is lowered; that the remaining fish on the plate 83 are discharged or dumped, when the plate 83 is shifted downwardly and the plate 10 backwardly, into the bin 32 in which they are bunched and discharged through the trap doors 33 and 34 into the individual segregating means and individually segregated, and that the fish, after leaving the segregating means last mentioned, are directed head foremost into the chute 70 by which they are turned on their backs preparatory to decapitating.

It is obvious from this construction, as illustrated in the drawings and disclosed in the foregoing specification, that there is provided a fish segregating, directing and turning apparatus as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a segregating apparatus, an intermittently shiftable hopper, and an intermittently shiftable supporting member positioned at one side of said hopper adapted to receive a few of the members contained in said hopper when the same is shifted to an extreme position.

2. In a segregating apparatus, an intermittently shiftable hopper, an intermittently shiftable supporting member positioned at one side of said hopper adapted to receive a few of the members contained in said hopper when the same is shifted to an extreme position, and a bunching means positioned contiguous to said shiftable supporting member adapted to receive the members segregated from the mass in said hopper by said supporting member.

3. In a segregating apparatus, a hopper, a shiftable supporting member positioned at one side of said hopper adapted to receive a few of the members contained in said hopper, and a bunching means positioned contiguous to said shiftable supporting member adapted to receive the members from said supporting member, said bunching means including a bin provided with a trap-door in its bottom, and a plurality of reciprocating bunching members.

4. In a segregating apparatus, an intermittently shiftable hopper, an intermittently shiftable supporting member positioned at one side of said hopper adapted to receive a few of the members contained in said hopper when the same is shifted to an extreme position, and a segregating means for receiving the members positioned on said supporting member and individually segregating the same.

5. In a segregating apparatus, an intermittently shiftable hopper, an intermittently shiftable supporting member positioned at one side of said hopper adapted to receive a few of the members contained in said hopper when the same is shifted to an extreme position, and a segregating means for receiving the members positioned on said supporting member and individually segregating the same, said segregating means including a plurality of intercommunicating shiftable segregating members, the alternate segregating members of said segregating means being shiftable in opposite directions from the adjacent segregating members thereof.

6. In an apparatus of the class described, a shiftable hopper, an intermittently shiftable supporting member positioned at one side of said hopper adapted to receive a few of the members contained in said hopper when the same is shifted, a segregating means for receiving and individually segregating the members discharged from said supporting member, and a directing means communicating with the discharge end of said segregating means for receiving the individually segregated members and directing the same with their corresponding ends in one direction.

7. In an apparatus of the class described, a shiftable hopper, an intermittently shiftable supporting member positioned at one side of said hopper adapted to receive a few of the members contained in said hopper when the same is shifted, a segregating means for receiving and individually segregating the members discharged from said supporting member, a directing means communicating with the discharge end of said segregating means for receiving the individually segregated members and directing the same with their corresponding ends in one direction, and a turning means in connection with said directing means for turning and uniformly positioning said segregated members about their longitudinal axes.

8. In an apparatus of the class described, a shiftable hopper, an intermittently shiftable supporting member positioned at one side of said hopper adapted to receive a few of the members contained in said hopper when the same is shifted, a segregating means for receiving and individually segregating the members discharged from said supporting member, said segregating means including a plurality of intercommunicating shiftable segregating members, the alternate segregating members of said segregating means being shiftable in opposite directions from the adjacent segregating members thereof, and a directing means communicating with the discharge end of said segregating means for receiving the individually segregated members and directing the same with their corresponding ends in one direction.

9. In an apparatus of the class described, a shiftable hopper, an intermittently shiftable supporting member positioned at one side of said hopper adapted to receive a few of the members contained in said hopper when the same is shifted, a segregating means for receiving and individually segregating the members discharged from said supporting member, said segregating means including a plurality of intercommunicating shiftable segregating members, the alternate segregating members of said segregating means being shiftable in opposite directions from the adjacent segregating members thereof, a directing means communicating with the discharge end of said segregating means for receiving the individually segregated members and directing the same with their corresponding ends in one direction, and a turning means in connection with said directing means for turning and uniformly positioning said segregated members about their longitudinal axes.

10. In an apparatus of the class described, a shiftable hopper, an intermittently shiftable supporting member positioned at one side of said hopper adapted to receive a few of the members contained in said hopper when the same is shifted, a segregating means for receiving and individually segregating the members discharged from said supporting member, and a pair of angularly positioned, oppositely disposed and oppositely reciprocating brushes positioned contiguous to the discharge end of said segregating means adapted to receive the individually segregated members therein.

11. In an apparatus of the class described, a shiftable hopper, an intermittently shiftable supporting member positioned at one side of said hopper adapted to receive a few of the members contained in said hopper when the same is shifted, a segregating means for receiving and individually segregating the members discharged from said supporting member, a pair of angularly positioned, oppositely disposed and oppositely reciprocating brushes positioned contiguous to the discharge end of said aggregating means adapted to receive the individually segregated members therein, and a directing receptacle positioned below and at the opposite ends of said brushes adapted to receive the members discharged therefrom.

12. In an apparatus of the class described, a shiftable hopper, an intermittently shiftable supporting member positioned at one side of said hopper adapted to receive a few of the members contained in said hopper when the same is shifted, a bunching means positioned contiguous to said supporting member adapted to receive the members segregated from the mass in said hopper on said supporting member, said bunching means including a bin provided with a trapdoor in its bottom and a plurality of oppositely reciprocating bunching members, and a segregating means for receiving and individually segregating the members discharged from said bunching means.

13. In an apparatus of the class described, a shiftable hopper, a shiftable supporting member positioned at one side of said hopper adapted to receive a few of the members contained in said hopper when the same is shifted, a bunching means positioned contiguous to said supporting member adapted to receive the members segregated from the mass in said hopper on said supporting member, a segregating means for receiving and individually segregating the members discharged from said bunching means, and a pair of oppositely disposed and oppositely reciprocating brushes positioned contiguous to the discharge end of said segregating means adapted to receive the individually segregated members therein.

14. In an apparatus of the class described, a shiftable hopper, a shiftable supporting member positioned at one side of said hopper adapted to receive a few of the members contained in said hopper when the same is shifted, a bunching means positioned contiguous to said supporting member adapted to receive the members segregated from the mass in said hopper on said supporting member, a segregating means for receiving and individually segregating the members discharged from said bunching means, a pair of oppositely disposed and oppositely reciprocating brushes positioned contiguous to the discharge end of said segregating means adapted to receive the individually segregated members therein, and a directing receptacle positioned below and at the opposite ends of said brushes adapted to receive the members discharged therefrom.

15. In a segregating means, a plurality of spaced apart rotatable supports provided with outwardly extending fingers, the fingers of the several supports being positioned intermediate the fingers of the adjacent supports, and means for rotating the alternate supports in opposite directions.

16. In a segregating means, a plurality of spaced apart rotatable supports provided with outwardly extending fingers, the fingers of the several supports being positioned intermediate the fingers of the adjacent supports, means for rotating the alternate supports in opposite directions, and means in connection with said last mentioned means for holding the alternate supports stationary during a portion of the rotatable movement of the other rotatable supports.

17. In a segregating means of the class described, a plurality of spaced apart rotatable supports positioned parallel with each other and substantially in the same plane, said plane being inclined with the horizontal, and said supports being provided with a plurality of spaced apart fingers extending outwardly from said supports, the portions extending to one side of said supports being substantially straight and the portions extending to the opposite sides of said supports being curved, the straight and curved portions of the fingers of one support being positioned and shiftable intermediate the respective curved and straight portions of the fingers supported on the adjacent rotatable supports.

18. In a segregating means of the class described, a plurality of spaced apart rotatable supports positioned parallel with each other and substantially in the same plane, said plane being inclined with the horizontal, and said supports being provided with a plurality of spaced apart fingers extending outwardly from said supports, the portions extending to one side of said supports being substantially straight and the portions extending to the opposite sides of said supports being curved, the straight and curved portions of the fingers of one support being positioned and shiftable intermediate the respective curved and straight portions of the fingers supported on the adjacent rotatable supports, means for rotating the alternate finger supports in opposite directions, and other means in connection with said last mentioned means for holding the alternate supports stationary during a portion of the rotatable movement of the other finger supports.

19. In a segregating means, a plurality of spaced apart, oppositely rotatable supports provided with conveying members extending transversely therefrom, and means for rotating alternately positioned supports a portion of a revolution before rotating the other supports.

20. In a segregating means, a plurality of spaced apart, oppositely rotatable supports provided with conveying members extending transversely therefrom, the conveying members of each support being positioned in intercommunicating relation with the conveying members of the adjacent supports.

21. In a segregating means, a plurality of spaced apart, oppositely rotatable supports provided with conveying members extending transversely therefrom, the conveying members of each support being positioned in intercommunicating relation with the conveying members of the adjacent supports, means for rotating the alternate supports in opposite directions, and means in connection with said last mentioned means for holding the alternate supports stationary during a portion of the rotatable movement of the other rotatable supports.

22. In a segregating means, a pair of oppositely rotatable and reversible intercommunicating conveying supports, and means for rotating alternately positioned supports a portion of a revolution before rotating the other supports in the opposite direction, forming segregating pockets between corresponding portions of adjacently positioned supports.

23. In a segregating means, a pair of oppositely rotatable and reversible intercommunicating conveying supports, means for rotating said supports in opposite directions, and other means for holding one of the supports stationary during a portion of the rotatable movement of the other support.

24. In an apparatus of the class described, an extended shiftable flexible hopper with its one side stationary, and automatic means for intermittently raising the opposite side of said hopper.

25. In an apparatus of the class described, an extended shiftable flexible hopper with its one side stationary, means for intermittently raising the opposite side of said hopper, and a pivotally mounted segregating and supporting member positioned at one side of said hopper adapted to receive fish therefrom when the one side of said hopper is raised, and means for intermittently rotating said segregating and supporting member about its pivotal mounting.

26. In a fish segregating apparatus, a hopper provided with a shiftable longitudinally extending flexible bottom.

27. In a fish segregating apparatus, a long hopper provided with a longitudinally extending sagging flexible bottom stationary at one edge and adapted to be shifted at its opposite edge at regular intervals.

28. In a segregating apparatus, a shiftable hopper, a segregating and supporting member shiftably mounted at one side thereof, and a limit member positioned at the upper side of said segregating and supporting member for limiting the supporting space thereon.

29. In a segregating apparatus, a shiftable hopper, an intermittently shiftable segregating and supporting member mounted at one side thereof and adapted to receive the contents therefrom, a limit member pivotally mounted at the upper side of said segregating and supporting member for limiting the supporting space thereon, and adjustable stop and release means in connection with said limit member to vary its position relatively to said segregating and supporting member and to permit its being shifted relatively thereto.

30. In a segregating apparatus, a shiftable hopper, an intermittently shiftable segregating and supporting member mounted at one side thereof and adapted to receive the contents therefrom, a limit member pivotally mounted at the upper side of said segregating and supporting member for limiting the supporting space thereon, and means for variously and simultaneously shifting said segregating and supporting member and said limit member.

31. In an apparatus of the class described, a fish segregating means, a fish turning means communicating therewith, and a fish stop means at the one end of said turning means for temporarily retarding the passage of fish when entering said turning means.

32. In an apparatus of the class described, a fish directing means, a fish turning means communicating with the discharge end thereof, and a fish stop means in connection with said turning means for retarding the fish in their passage through said turning means.

33. In an apparatus of the class described, a fish directing means, a fish turning chute communicating at its one end with said directing means, and a stop member shiftably mounted at the discharge end of said directing means.

34. In an apparatus of the class described, a segregating means, a chute communicating at its one end therewith, and a timing means in association with said chute for timing the passage of members therethrough.

35. In an apparatus of the class described, a directing means, a chute communicating at its one end with said directing means, and a timing means in association with said chute for timing the passage of members therethrough.

36. In an apparatus of the class described, a fish segregating means, a fish turning chute associated at its one end therewith, and a timing means in association with said chute for timing the discharge of fish from the opposite end of said chute.

37. In an apparatus of the class described, a fish directing means, a chute communicating at its one end with the discharge end of said directing means, and a stop member extending into said chute adapted to be intermittently removed therefrom for timing the discharge of fish from the opposite end of said chute.

38. In an apparatus of the class described, an inclined fish turning chute merging in gradual curves from a relatively shallow and wide cross-section at its head end into a relatively deep, curved bottom, U-shaped cross-section at its opposite end, and a stop means extending into said chute at its head end and adapted to be intermittently removed therefrom.

39. In a segregating apparatus, a shiftable hopper, a supporting member positioned at one side and at the upper edge of said hopper, and a dumping member mounted at one side for dumping excessive quantities of the contents of said hopper, received from the latter, back into the same.

40. In a segregating apparatus, a shiftable hopper, a supporting member positioned at one side and at the upper edge of said hopper, and a dumping plate pivotally mounted at one edge to the edge of the supporting member extending toward said hopper, said dumping plate being normally extended into said hopper and adapted to be simultaneously shifted with the same.

41. In a segregating apparatus, a hopper, a receiving and supporting means positioned at one side of said hopper adapted to receive a portion of the contents of the latter, and a quantity limiting member shiftably mounted at the upper side of said receiving and supporting means for limiting the supporting space on the latter.

42. In a segregating apparatus, a hopper, a receiving and supporting means positioned at one side of said hopper adapted to receive a portion of the contents of the latter, and a limiting means in association with said receiving and supporting means for controlling the supporting space of the latter.

In testimony whereof, I have hereunto set my hand at San Diego, California, this 12th day of June, 1925.

FRANK HEATH.